Patented June 30, 1942

2,288,422

UNITED STATES PATENT OFFICE 2,288,422

MIXED UREAS

Alfred Rohm, Leverkusen I. G.-Werk, Germany, assignor to General Aniline & Film Corporation, New York, N. Y., a corporation of Delaware No Drawing. Application November 13, 1939, Serial No. 304,177. In Germany November 11, 1938

4 Claims. (Cl. 260—506)

(Granted under the provisions of sec. 14, act of March 2, 1927; 357 O. G. 5)

The present invention relates to mixed ureas containing solubilizing groups and to a process of preparing the same.

In my application Ser. No. 304,176 filed November 13, 1939, entitled "Urethanes," a process for the manufacture of urethanes is described. This process consists in allowing chloroformic esters of aromatic hydroxy compounds to react with the aqueous solution of an aliphatic or aromatic primary or secondary amine which contains at least one watersolubilizing group.

I have found that the urethanes thus obtained can be converted into water-soluble mixed ureas by allowing the said urethanes to react in aqueous solution with primary or secondary aliphatic or aromatic amines which may be further substituted and which may or may not contain solubilizing groups. By the new process it is possible to prepare a large number of hitherto unknown mixed ureas having solubilizing groups. These ureas are obtained according to the process in very good yields. The reaction is preferably carried out in rather concentrated solution; it is mostly performed at a pH of about 7 to 8; the pH value may, however, be shifted to the acid or alkaline side. The temperature may vary over wide limits. In order to use up the urethane in the reaction as completely as possible it is in most cases expedient to employ the amine in excess.

The water-soluble mixed ureas obtained according to the new process are valuable intermediates for the preparation of dyestuffs or are dyestuffs per se.

Various methods are already known for the preparation of mixed ureas having solubilizing groups. Thus, in some cases ureas can be prepared by the action of phosgene upon a mixture of the two amines $NH_2.R_1.X$ and $NH_2.R_2.Y$. The ureas obtained correspond to the formula:

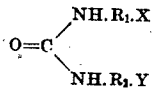

wherein $R_1$ and $R_2$ stand for organic radicals which are different from each other and are substituted by at least one solubilizing radical X and Y each. By this process only a poor yield of mixed ureas is obtained, since as further reaction products two symmetrical ureas

and $CO(NH—R_2—Y)_2$ are formed and since the complete separation of these products from the mixed urea is practically not possible in most cases. In the same manner and with the same disadvantages and may also be prepared according to the known process ureas which correspond to the following formula:

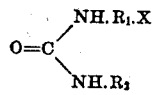

in which only one amine radical contains a solubilizing group. Besides the described so-called "mixed phosgenation" the preparation of these last mentioned mixed ureas is also possible by allowing the isocyanate $R_2—N=C=O$ to react with the amine $NH_2—R_1—X$. This process, however, depends on the possibility of preparing the isocyanate $R_2—N=C=O$, the preparation of which can only be carried out in the absence of solubilizing groups and only, if $R_2$ contains no or only simple substituents and then in most cases only with poor yields.

Compared with these known processes the new process shows the advantage of yielding water-soluble mixed ureas directly with excellent results, by a simple reaction.

The formation of mixed ureas from urethanes of aromatic hydroxy compounds and amines is further described in the literature (Chemisches Zentralblatt 1937, II, 1538). This process, however, is carried out in the absence of solvents at temperatures above 100° C. and the compounds thus obtained do not contain water-solubilizing groups. This process accordingly does not present the possibility of preparing mixed ureas having solubilizing groups.

The following examples illustrate the invention without, however, restricting it thereto.

Example 1

16.8 gms. of phenyl chloroformate are added drop by drop to a neutral to weakly acid solution of 26.1 gms. of the sodium salt of 2-amino-5-hydroxynaphthalene-7-sulfonic acid in 400 cc. of water at 25–30° C. The pH of the solution is kept weakly acid to neutral by simultaneously adding drop by drop sodium carbonate solution. When the pungent odor of the ester has disappeared and the solution can no longer be diazotized (if necessary some more ester has to be added), most of the urethane deposits as colorless paste and can be obtained with excellent yield by adding sodium chloride. To the paste thus obtained 16 gms. of 1-amino-4-acetaminobenzene are added. By adding sodium carbonate and sodium phosphate the reaction of the mixture is brought to pH 7.5 and the mixture is heated for several hours to 30–40° C. Thereby the urethane dissolves, phenol is split off and 1-amino-4-acetaminobenzene disappears almost completely. By taking test portions and titrating them with sodium nitrite and hydrochloric acid the course of the reaction can be checked. The phenol is now either distilled off with steam having a weakly acid reaction or the mixed urea is precipitated at 50° C. in well crystallized leaflets by adding sodium chloride and filtered off. The yield is about 90% of the theory calculated on 2-amino-5-hydroxynaphthalene-7-sulfonic acid. The urea corresponds in the form of its sodium salt to the following formula:

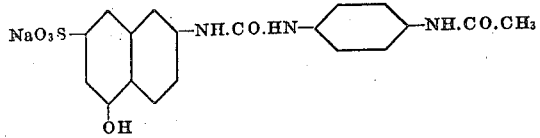

The 2-amino-5-hydroxynaphthalene-7-sulfonic acid can be replaced by any other aromatic amine containing sulfonic or carboxylic acid groups. The 4-amino-4-acetaminobenzene can be replaced by other substitution products of aniline and also by substitution products of N-alkyl-anilines.

*Example 2*

To a paste of 0.1 mol of 2-amino-5-hydroxynaphthalene-7-sulfonic acid-o-phenylurethane in 400 cc. of water 18.7 gms. of the sodium salt of 5-amino-2-hydroxybenzoic acid are added, the mixture is brought to pH 7.5, heated to about 40° C. until complete dissolution has occurred and stirred for 12 hours. In order to isolate the reaction product 20% sodium chloride are added. The mixed urea of 2-amino-5-hydroxynaphthalene-7-sulfonic acid and 5-amino-2-hydroxybenzoic acid deposits as fine powder and is sucked off. The yield is about 92%. The urea corresponds in the form of its sodium salt to the following formula:

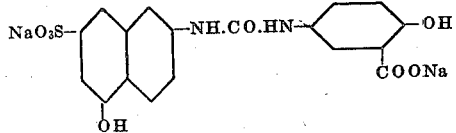

Also in this example instead of 2-amino-5-hydroxynaphthalene-7-sulfonic acid other aminonaphthalene or benzene sulfonic acids and carboxylic acids or their derivatives can be used. Instead of 5-amino-2-hydroxybenzoic acid numerous amines of the benzene or naphthalene series with solubilizing groups or substitution products of these compounds may be employed.

*Example 3*

To a paste of 0.1 mol of 1-amino-5-hydroxynaphthalene-7-sulfonic acid-o-phenylurethane 12 gms. of 1.4-diaminobenzene are added, the mixture is brought to pH 7.5 and heated to about 50° C. until dissolution has occurred. Now the mixture is acidified and the phenol is distilled off with steam. The mixed urea is precipitated from the hot solution in a very good yield by rendering the solution acid to Congo red paper and adding sodium chloride. In order to remove traces of 1-amino-5-hydroxynaphthalene-7-sulfonic acid which might have been formed, the urea is once more isolated from an alkaline solution. The mixed urea corresponds in the form of its sodium salt to the following formula:

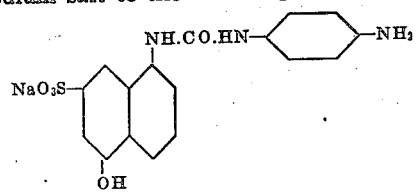

Instead of 1.4-diaminobenzene also 1.4-diaminobenzene sulfonic acid or 1.4-diaminobenzene carboxylic acid or other diamines may be used. It is also possible to prepare first the urethane of 1.4-diaminobenzene sulfonic acid and to react this urethane with 1-amino-5-hydroxynaphthalene-7-sulfonic acid to form the mixed urea.

*Example 4*

To a paste of 0.1 mol of 2-amino-5-hydroxynaphthalene-7-sulfonic acid-o-phenylurethane in 400 cc. of water, 15.8 gms. of diethanol-amine are added and stirred at room temperature until dissolution is complete. When the reaction is finished the mixed urea of 2-amino-5-hydroxynaphthalene-7-sulfonic acid and diethanolamine is precipitated from acid solution in a very good yield by adding sodium chloride. The urea corresponds in the form of its sodium salt to the following formula:

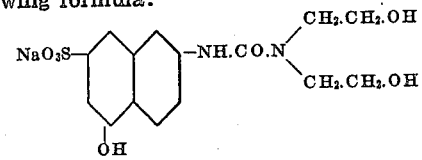

The same compound is obtained from diethanol-amine-phenyl-urethane (easily obtainable from diethanol-amine in aqueous solution and phenyl chloroformate) by allowing this compound to react with 2-amino-5-hydroxynaphthalene-7-sulfonic acid.

*Example 5*

To a paste of 0.1 mol of 2-amino-8-hydroxynaphthalene-6-sulfonic acid-o-phenylurethane in 400 cc. of water, 30.6 gms. of the sodium salt of 4-hydroxy-4'-amino-azobenzene - 5 - carboxylic acid are added, the mixture is brought to pH 7.2 and is heated for several hours to 50° C. until the formation of the mixed urea is complete. After acidifying, the phenol is distilled off with steam and the mixed urea of 2-amino-8-hydroxynaphthalene-6-sulfonic acid and 4-hydroxy-4'-amino-azobenzene-5-carboxylic acid is isolated as crystals in a yield of 90% from weakly alkaline solution by adding sodium chloride. The mixed urea corresponds in the form of its sodium salt to the following formula:

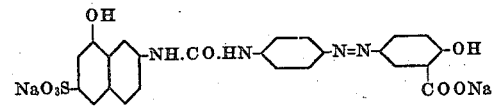

Instead of 4-hydroxy-4'-amino-azobenzene-5-carboxylic acid other aminoazo compounds and also aminodisazo dyestuffs can be employed.

*Example 6*

A paste of the phenylurethane of 2-amino-8-hydroxynaphthalene-6-sulfonic acid prepared from 26.1 gms. of the sodium salt of 2-amino-8-hydroxynaphthalene-6-sulfonic acid and having a volume of 300 cc. is stirred at pH 7–8 and at 60° C. with 15 gms. of aminoacetic acid. By adding 5 gms. of secondary sodium phosphate and by adding drop by drop sodium carbonate solution the reaction mixture is kept at pH 7-8. When the urethane is completely dissolved the mixture is further stirred for some time at 60° C. The mixed urea of 2-amino-8-hydroxynaphthalene-6-sulfonic acid and amino-acetic acid is isolated as crystalline colorless powder from acid solution by adding sodium chloride in a yield of about 90%. The urea corresponds in the form of its sodium salt to the following formula:

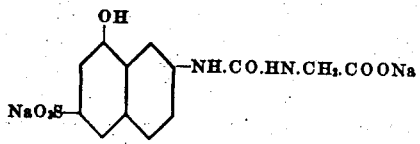

The same compound is obtained by the reaction of the urethane obtained in aqueous solution from aminoacetic acid and phenyl chloroformate, with the sodium salt of 2-amino-8-hydroxynaphthalene-6-sulfonic acid.

*Example 7*

The 4-chlorophenylurethane of 2-methyl-amino-5-hydroxynaphthalene-7-sulfonic acid, obtained from 27.5 gms. of the sodium salt of 2-methlyamino-5-hydroxynaphthalene-7-sulfonic acid and 20 gms. of 4-chlorophenyl chloroformate, is dissolved in 400 cc. of water. At 70% C. and pH 7.5, 20 gms. of 4.4'-diaminodiphenyl are added to the solution, the mixture is stirred for several hours, then allowed to cool to 30° C, and the excess 4.4'-diaminodiphenyl is filtered off. By adding sodium chloride the mixed urea of 2-methyl-amino-5-hydroxynaphthalene-7-sulfonic acid and 4.4'-diaminodiphenyl is separated in crystalline form in a yield of about 90%. The urea corresponds in the form of its sodium salt to the following formula:

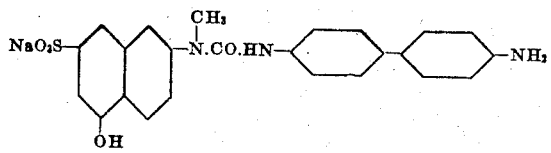

*Example 8*

From 17.5 gms. of the sodium salt of 5-amino-2-hydroxybenzoic acid and phenyl chloroformate the phenylurethane is prepared as a paste. To this paste 17 gms. of 1.4-diaminobenzene carboxylic acid are added, the mixture is brought to pH 7.5 and heated to 60° C. for several hours until dissolution is complete. Now the mixture is acidified and the phenol formed is distilled off with steam. When cold the 4-hydroxy-4'-amino-diphenyl-urea-3.3'-dicarboxylic acid can be separated with a very good yield by adding sodium chloride. The same compound can be obtained by the reaction of the phenyl-urethane from 3-amino-6-nitro-benzoic acid with 5-amino-2-hydroxybenzoic acid and subsequent reduction of the nitro group.

*Example 9*

The phenylurethane is prepared from 45.9 gms. of the o-benzene sulfonic ester of 1-amino-8-hydroxynaphthalene-3.6-disulfonic acid and the corresponding quantity of phenyl chloroformate, and stirred with 12 gms. of 1.4-diaminobenzene at pH 7.5 and 60° C. for several hours until almost all of the 1.4-diaminobenzene has dissolved. After cooling and filtering off the undissolved 1.4-diaminobenzene the mixed urea is precipitated by adding sodium chloride. It corresponds in the form of its sodium salt to the following formula:

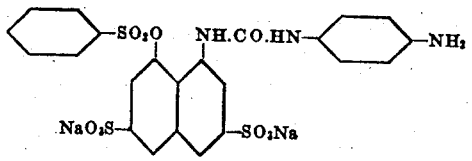

By heating with dilute caustic soda lye the ester group can be saponified whereby the mixed urea of 1-amino-8-hydroxynaphthalene-3.6-disulfonic acid and 1.4-diaminobenzene is obtained.

*Example 10*

44.4 gms. of the sodium salt of 4-nitro-4'-aminostilbene-2.2'-disulfonic acid are converted into the phenylurethane and heated with 30.6 gms. of the sodium salt of 4-hydroxy-4'-amino-azobenzene-5-carboxylic acid to 50° C. for several hours. When the reaction is complete, the mixed urea precipitates in a very good yield after the addition of sodium chloride in a sodium carbonate alkaline reaction. It corresponds in the form of its sodium salt to the following formula:

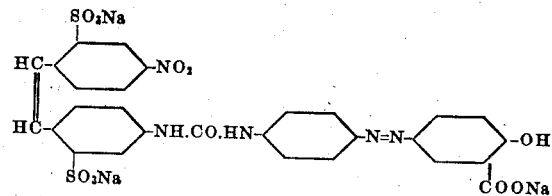

Instead of nitroaminostilbenedisulfonic acid there may also be employed dehydrothiotoluidine disulfonic acid, 4-aminostilbene-4'-naphthionic acid-triazole-2.2'-disulfonic acid or any aminoazo dyestuff such as the monoazodyestuff from diazotized o-benzenesulfonic ester of 1-amino-8-hydroxynaphthalene-3.6-disulfonic acid and 1-amino-2-methoxy-5-methylbenzene which after saponification yields the mixed urea of 4-hydroxy-4'-amino-azobenzene-5-carboxylic acid and 1-(4'-amino-3'-methoxy-6'-methylbenzene-azo)-8-hydroxynaphthalene-3.6-disulfonic acid.

*Example 11*

To a paste of 0.1 mol of 2-amino-5-hydroxy-naphthalene-7-sulfonic acid-o-phenylurethane in 400 cc. of water 5 gms. (=0.046 mol) of 1.4-diaminobenzene are added and the mixture heated at pH 7.5 to 70-80° C. until complete dissolution is reached and the diazotization value of the solution no longer decreases. The phenol is distilled off with steam from the acidified solution and the di-urea is isolated. It corresponds in the form of its sodium salt to the following formula:

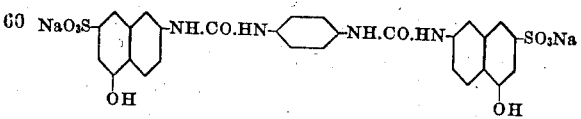

Instead of 1.4-diaminobenzene other diamines and their substitution products such as ethylene diamine, 4.4'-diaminodiphenyl and others can be employed.

Mixed di-ureas of three different amines can be prepared when using for the preparation of the urethane for instance the urea of 2-amino-5-hydroxynaphthalene-7-sulfonic acid and 1.4-diaminobenzene described in Example 3 and allowing this urethane to react with any other amine.

Example 12

0.1 mol of the phenylurethane of 4-nitro-4'-aminostilbene-2,2'-disulfonic acid is allowed to react with 0.1 mol of 2-methyl-amino-5-hydroxy-naphthalene-7-sulfonic acid in the manner described in the previous examples, the phenol is distilled off with steam, the nitro group is reduced to the amino group and the mixed urea is isolated. It corresponds in the form of its sodium salt to the following formula:

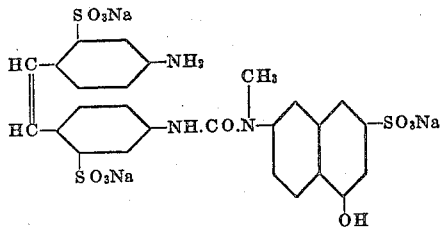

Example 13

15.8 gms. (=0.11 mol) of 8-aminoquinoline are added to 0.1 mol of the phenylurethane of 2-amino-5-hydroxynaphthalene-7-sulfonic acid. The mixture is heated for several hours to 60° C. with stirring. The phenol is distilled off while steam from the acidified solution, the mixed urea is isolated and freed from admixed 8-aminoquinoline by extraction with ether. The mixed urea corresponds in the form of its sodium salt to the following formula:

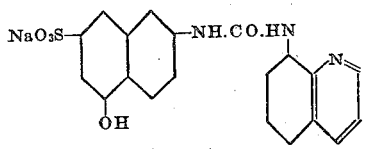

In a similar manner amino or alkylamino derivatives of other heterocyclic compounds with or without solubilizing groups can be converted into mixed ureas.

Example 14

A neutral paste of 0.1 mol of the phenylurethane of 2-amino-5-hydroxynaphthalene-7-sulfonic acid is heated together with 11.7 gms. (=0.12 mol) of cyclohexylamine for several hours to 60° C., the phenol is distilled off with steam from the acidified solution and the mixed urea is isolated by adding sodium chloride. The urea corresponds in the form of its sodium salt to the following formula:

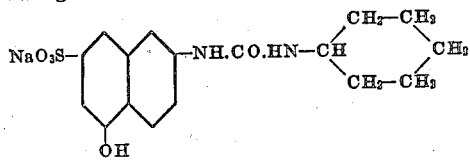

In a similar manner other cycloaliphatic primary or secondary amines and the substitution products thereof can be converted into mixed ureas.

Example 15

A neutral paste of 0.1 mol of the phenylurethane of 2-amino-5-hydroxynaphthalene-7-sulfonic acid is heated with an aqueous solution of 4 gms. (=0.12 mol) of hydroxylamine for several hours, the phenol is distilled off with steam from the acidified solution and the mixed urea is isolated. It corresponds in the form of its sodium salt to the following formula:

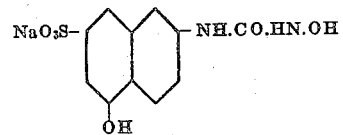

In the same manner also the substitution products of hydroxylamine can be converted into mixed ureas.

Example 16

A neutral paste of 0.1 mol of the phenylurethane of 2-amino-5-hydroxynaphthalene-7-sulfonic acid is heated with an aqueous solution of 4 gms. (=0.12 mol) of hydrazine for several hours, the phenol is distilled off with steam from the acidified solution and the mixed urea of 2-amino-5-hydroxynaphthalene-7-sulfonic acid and hydrazine (5-hydroxy-7-sulfo-2-naphthyl-semicarbazide) is isolated by adding sodium chloride. In the same way also substitution products of hydrazine can be employed.

Example 17

A neutral paste of 0.1 mol of the phenylurethane of 2-amino-5-hydroxynaphthalene-7-sulfonic acid is heated with 10 gms. (=0.12 mol) piperidine for several hours to 60° C., the phenol is distilled off from the acidified solution with steam and the mixed urea is isolated by adding sodium chloride. The urea corresponds in the form of its sodium salt to the following formula:

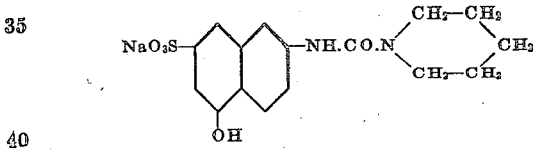

Also substitution products of cyclic secondary amines may be employed.

I claim:

1. Process for the preparation of mixed water-soluble ureas from urethanes of the general formula:

wherein R stands for an aromatic radical, R' stands for a radical selected from the group consisting of aliphatic and aromatic radicals containing at least one solubilizing group selected from the class consisting of sulfonic, carboxylic and hydroxy groups, and X stands for one of the group consisting of hydrogen, alkyl and aryl, which process consists in allowing the said urethanes to react in aqueous solution with amines selected from the group consisting of primary and secondary aliphatic and aromatic amines.

2. Process for the preparation of mixed water-soluble ureas from urethanes of the general formula:

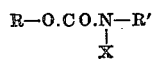

wherein R stands for an aromatic radical, R' stands for a radical selected from the group consisting of aliphatic and aromatic radicals containing at least one solubilizing group selected from the class consisting of sulfonic, carboxylic and hydroxy groups, and X stands for one of the group consisting of hydrogen, alkyl and aryl, which process consists in allowing the said urethanes to react in aqueous solution at medium pH-values with amines selected from the group consisting of primary and secondary aliphatic and aromatic amines.

3. Process for the preparation of mixed water-soluble ureas from urethanes of the general formula:

$$R-O.CO.N-R'$$
$$\phantom{R-O.CO.N-}|$$
$$\phantom{R-O.CO.N-}X$$

wherein R stands for an aromatic radical, R' stands for a radical selected from the group consisting of aliphatic and aromatic radicals containing at least one solubilizing group selected from the class consisting of sulfonic, carboxylic and hydroxy groups, and X stands for one of the group consisting of hydrogen, alkyl and aryl, which process consists in allowing the said urethanes to react in aqueous solution at pH-values of about 7 to about 8 with amines selected from the group consisting of primary and secondary aliphatic and aromatic amines.

4. Process for the preparation of mixed water-soluble ureas from urethanes of the formula:

$$R-O.CO.N-R'$$
$$\phantom{R-O.CO.N-}|$$
$$\phantom{R-O.CO.N-}X$$

wherein R stands for an aromatic radical, R' stands for a radical selected from the group consisting of aliphatic and aromatic radicals containing at least one solubilizing group selected from the class consisting of sulfonic, carboxylic and hydroxy groups, and X stands for one of the group consisting of hydrogen, alkal and aryl, which process consists in allowing the said urethanes to react in aqueous solution at pH-values of about 7 to about 8 and at temperatures between about room temperature and about 80° C. with amines selected from the group consisting of primary and secondary aliphatic and aromatic amines.

ALFRED ROHM.